June 29, 1926.
A. E. KAMMRITZ
1,590,947
HEADLIGHT INDICATOR
Filed Feb. 11, 1925
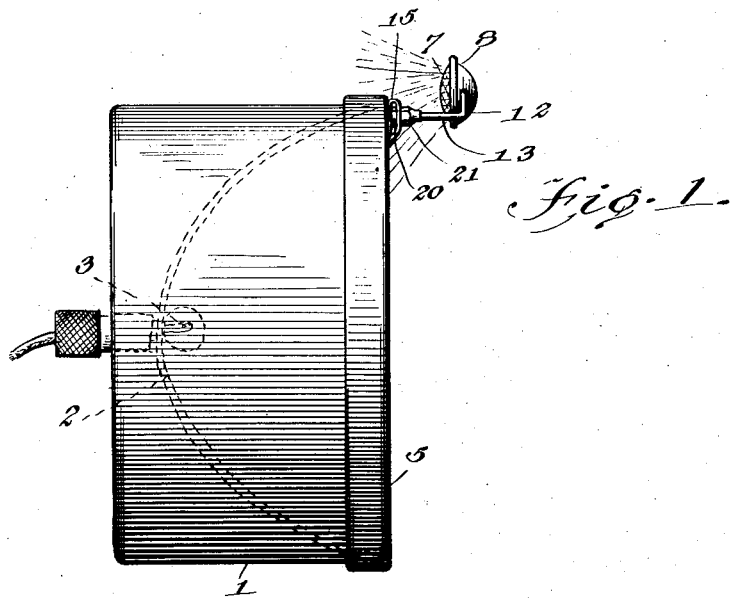
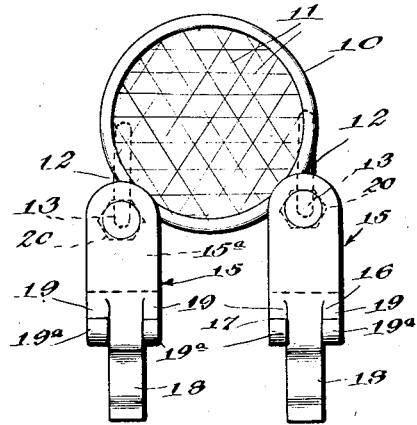
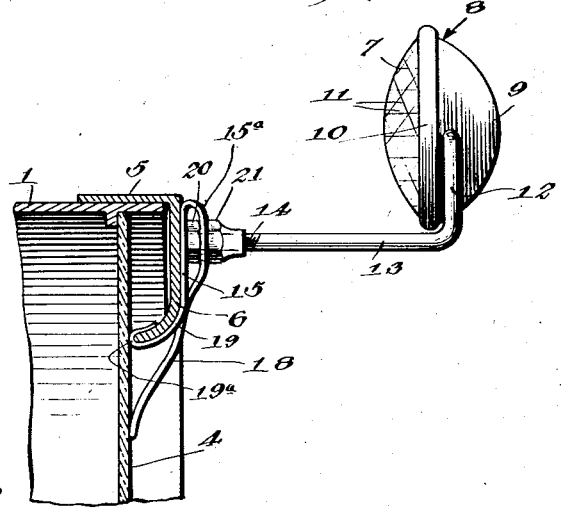
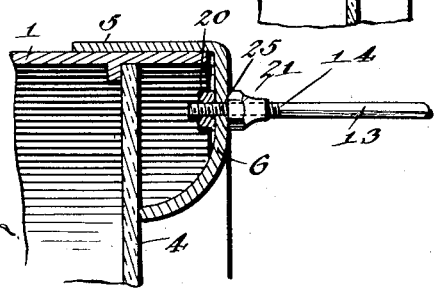
WITNESSES
INVENTOR
A. E. Kammritz,
BY
ATTORNEYS Patented June 29, 1926.

1,590,947

UNITED STATES PATENT OFFICE.

ARTHUR E. KAMMRITZ, OF HARTFORD, CONNECTICUT.

HEADLIGHT INDICATOR.

Application filed February 11, 1925. Serial No. 8,476.

My invention is an improvement in indicators for the headlights of automobiles, and it consists in the combinations, constructions and arrangements herein described and claimed.

An object of the invention is the provision of an attachment for the headlight of an automobile which will be effective to reflect back to the driver of the automobile rays of light from the headlight without interfering with the desired projection of rays of light from the headlight to effect illumination of the roadway, whereby the device will indicate to the driver of the automobile whether or not the headlight lamp is lighted.

A further object of the invention is the provision in a headlight indicator of an efficient and ornamental reflecting medium.

A still further object of the invention is the provision in a headlight indicator of a novel and reliable means for detachably securing the headlight indicator to the casing of the headlight so that the indicator will be in a desirable position with respect to rays of light from the headlight, and to the seat for the driver of the automobile.

Other objects and advantages of the invention will be apparent from the following description, considered in conjunction with the accompanying drawing, in which Figure 1 is a side elevation of an automobile headlight equipped with an indicator embodying the invention, Figure 2 is a face view of the headlight indicator and of the means now preferred by me for attaching the indicator to the headlight, Figure 3 is a view showing in vertical section a fragmentary portion of the headlight casing and lens, and the preferred means for securing the headlight indicator to the headlight.

Figure 4 is a view similar to Figure 3 showing a slightly different method of attaching the supporting means for the headlight indicator to the headlight.

In Figure 1, I show an automobile headlight having a casing 1 which is shown as being drum-shaped but which may be of any suitable and desired shape. A reflector 2 which may be of the usual parabolic shape is disposed within the headlight casing and a lamp 3 is supported within the reflector for projecting rays of light. The headlight casing 1 has a lens 4 mounted in the rim portion thereof, as shown in Figures 3 and 4 and held against outward displacement from the body of the headlight casing by a lens retaining ring 5 having an inwardly extending flange 6 which is curved inwardly at its inner edge to provide a stop for preventing outward movement of the lens in the body of the headlight casing. The construction described so far is ordinary and may vary in details of construction from those illustrated in the drawing and described in the foregoing since the parts described so far form no part of the invention except in so far as they cooperate with the parts which will now be described.

The improved headlight indicator includes a reflector comprising a translucent member 7 and a holder 8 for the translucent member 7. The holder 8 may be circular in cross sectional contour at its edge and may comprise an opaque body 9 merged into a rim portion 10 in which the translucent member 7 fits. The holder 8 may be made of any suitable material, such as a suitable metal, which can be polished so that the inner surface thereof will reflect back rays of light which enter the body of the holder 8 through the translucent member 7, the walls of the holder 8 being opaque. If desired, the inner surface of the body 9 of the holder may be provided with a coating, not shown, of quick silver.

The member 7 is formed of colored glass and serves as a lens. The outer face of the member or lens 7 is convexly curved and is formed to comprise a plurality of facets as indicated at 11.

The holder 9 is supported between the upper ends of upturned outer end portions 12 of a pair of supporting rods 13, the upturned end portions 12 of the respective rods 13 being secured at their upper ends to the body of the holder at points diametrically opposite the latter in any suitable known manner, as by being welded thereto. The inner end portions of the rods 13 are provided with screw threads 14. The inner end portions of these supporting rods may be attached to the headlight casing by means of clips 15. Each clip 15 may be formed of a strip of material which possesses considerable inherent resiliency, such as spring steel. This strip of spring material is bent transversely to provide a curved return arm 15ᵃ which is substantially parallel to the body of the strip for part of its length and then is bent against and secured to the body of the strip in any suitable known manner, as by welding. Spaced longitudinally extending slits 16 and 17 respectively are made in the opposite end of the strip of spring material, thus defining a middle tongue portion 18 and a pair of side tongues 19. The end portions of the side tongues 19 are bent to provide hooks 19ª which are adapted to engage with the inwardly turned edge portion of the flange 6 of the lens retaining ring when the body of the clip is disposed against the flange 6 of the lens retaining ring and the tongue 18 is arranged to bear against the lens 4. The arm 15ª is provided with a transverse opening through which the threaded end portion of one of the rods 13 may extend. A nut 20 is disposed between the arm 15ª and the body of the clip and is in threaded engagement with the inner end portion of one of the rods 13 and cooperates with a second nut, 21, which is screwed on the threaded inner end portion of the rod 13 aginst the outer face of the arm 15ª of the clip. It of course will be understood that there is a clip 15 and nuts 20 and 21 for each of the rods 13.

From the foregoing description of the various parts of the invention, the operation thereof will be readily understood. When the clips 15 to which the rods 13 are secured are engaged with the upper portion of the lens retaining ring 5 and the bracing tongues 18 are in contact with the lens 4 as shown in Figure 3, the holder 8 with the lens 7 therein will be supported above the path of the rays of light which are projected forward and downward from the headlight but the lens 7 will intercept rays of light which pass forwardly and upwardly from the head-light and such rays of light will be reflected back to the driver of the vehicle and will indicate whether or not the source of light within the headlight 1 is emitting rays of light. The provision of the facets 11 and the coloring of the lens 11 as desired will result in the indicating device having an ornamental and attractive appearance, as well as being useful for the purpose of indicating to the driver of the vehicle whether or not the headlight lamp is active. The arrangement just described for fastening the rods 13 to the headlight affords facilities for supporting the device removably on the headlight without there being any necessity of making any change whatsoever in the usual construction of the headlight. However, if so desired, the clips 15 may be dispensed with and the rods 13 may be attached directly to the lens retaining ring by providing openings such as indicated at 25 in the flange 6 of the lens retaining ring, as shown in Figure 4, each of the openings 25 being adapted to receive the threaded inner end portion of one of the rods 13 and the nut 20 being screwed on the inner end portion of the rod 13 against the inner face of the flange 6 while the nut 21 is screwed on the threaded inner end portion of the rod 13 against the outer face of the flange 6. The operation of the device when the rods 13 are attached to the flange 6 in the manner illustrated in Figure 4 is identical in essential respects with the operation of the device when the rods 13 are attached to the headlight by means of the clips 15.

Obviously, the invention is susceptible of embodiment in forms other than those illustrated in the accompanying drawing and I therefore consider as my own all such modifications and adaptations thereof as fairly fall within the scope of the appended claims.

I claim:—

1. A headlight indicator comprising a reflector, a rod having an upturned outer end portion secured to said reflector, a clip made of spring material and comprising a body adapted to rest flatwise against the lens retaining flange at the edge of a headlight, said clip having an arm spaced from said body and provided with an opening througn which the inner end portion of said rod extends, a pair of clamping nuts in threaded engagement with said rod and respectively in contact with opposite faces of said arm of the clip, a pair of hook members on the body of the clip engageable with the edge portion of said lens retaining flange of the headlight, and a spring tongue between said hook members adapted to bear against the lens of the headlight when said hook members are engaged with the edge portion of said lens retaining flange.

2. A headlight indicator comprising a reflector, a clip made of spring material and comprising a body formed with a hook engageable with the edge portion of the lens retaining flange of a headlight and formed also with a spring tongue adapted to bear against the lens of the headlight when said hook is engaged with said lens retaining flange, and supporting means attached to the body of the clip for supporting said reflector in advance of said headlight.

ARTHUR E. KAMMRITZ.